United States Patent
Brown et al.

(10) Patent No.: US 12,424,964 B2
(45) Date of Patent: Sep. 23, 2025

(54) DYNAMIC MODELS FOR INDUCTOR TEMPERATURE

(71) Applicant: FORD GLOBAL TECHNOLOGIES, LLC, Dearborn, MI (US)

(72) Inventors: William Robert Brown, Huntington Woods, MI (US); Baoming Ge, Okemos, MI (US); Papiya Bagchi, Northville, MI (US); Monty Anderson, Boise, ID (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 178 days.

(21) Appl. No.: 18/162,915

(22) Filed: Feb. 1, 2023

(65) Prior Publication Data

US 2024/0258954 A1    Aug. 1, 2024

(51) Int. Cl.
| | |
|---|---|
| *H02P 29/68* | (2016.01) |
| *H02J 7/00* | (2006.01) |
| *H02P 23/00* | (2016.01) |
| *H02P 27/06* | (2006.01) |

(52) U.S. Cl.
CPC ............ *H02P 29/68* (2016.02); *H02J 7/0063* (2013.01); *H02P 23/0004* (2013.01); *H02P 27/06* (2013.01); *H02J 2207/20* (2020.01)

(58) Field of Classification Search
CPC ...... H02P 29/68; H02P 23/0004; H02P 27/06; H02J 7/0063; H02J 2207/20
USPC ......................................................... 318/139
See application file for complete search history.

(56) References Cited

U.S. PATENT DOCUMENTS

| | | | |
|---|---|---|---|
| 2016/0137192 A1 | 5/2016 | Wu et al. | |
| 2019/0111909 A1* | 4/2019 | Shimizu | ............ B60W 30/1843 |
| 2019/0391022 A1* | 12/2019 | Higaki | ............... H05K 7/20945 |
| 2022/0068541 A1* | 3/2022 | Vafakhah | ................ H01F 27/12 |

FOREIGN PATENT DOCUMENTS

| | | | |
|---|---|---|---|
| JP | 2004112855 A | * | 4/2004 |
| JP | 2016041012 | * | 3/2016 |

* cited by examiner

*Primary Examiner* — Jorge L Carrasquillo
(74) *Attorney, Agent, or Firm* — David B. Kelley; Brooks Kushman P.C.

(57) ABSTRACT

An electric drive system includes an inverter and a variable voltage converter. An inductor associated with the variable voltage converter is subject to temperature limits. Dynamic models are used to estimate the temperature of the inductor. Inputs to these dynamics models include DC current, DC voltage, Battery Voltage, oil pump speed, motor speed, and sump temperature. Empirical constants in the models are set based on vehicle testing.

7 Claims, 5 Drawing Sheets

DYNAMIC MODELS FOR INDUCTOR TEMPERATURE

TECHNICAL FIELD

The present disclosure relates to control of electrified vehicle powertrains. More particularly, the disclosure relates to use of dynamic models to estimate a temperature of an inductor in a DC/DC converter and control the powertrain accordingly.

BACKGROUND

An electric drive system includes a battery, a power electronics module, and a motor. The power electronics module includes a variable voltage converter that boosts the DC battery voltage to a higher DC voltage for use by an inverter. During operation, an inductor associated with the variable voltage converter may get warm. The inductor may be cooled by various mechanisms. To stay within design temperature limits, the motor operating envelop must occasionally be restricted based on the inductor temperatures.

SUMMARY

An electric drive system includes a battery, a variable voltage converter, an electric motor, an inverter, and a controller. The battery has a battery voltage. The variable voltage converter has battery terminals and output terminals. The battery terminals are electrically connected to the battery. The variable voltage converter establishes an output DC voltage between the output terminals different from the battery voltage. The output DC voltage may be higher than the battery voltage. The variable voltage converter has an inductor. The inverter is electrically connected to the output terminals and provides the electric motor with AC power. The controller is programmed to control the variable voltage converter to adjust the output DC voltage and to control the inverter to adjust a torque produced by the electric motor. The controller is further programmed to reduce the torque in response to an estimate of a temperature of the inductor exceeding a threshold. The output DC voltage may also be reduced in response to the estimate of the inductor temperature exceeding the threshold. The estimate is output by a dynamic model having the output voltage as an input. The inputs of the dynamic model may also include a pump speed of a coolant pump, a speed of the electric motor, and a coolant sump temperature. The dynamic model may be a second order dynamic model.

A method of operating a motor of an electric drive system includes adjusting an output DC voltage of a variable voltage converter, adjusting a winding current, and reducing a motor torque. The variable voltage converter has an inductor. Adjusting the winding current causes a motor to produce the motor torque. The torque is reduced in response to an estimate of an inductor temperature exceeding a threshold. The output DC voltage may also be reduced in response to the estimate of the inductor temperature exceeding the threshold. The inductor temperature is estimated by the controller using a dynamic model based on the output DC voltage. The dynamic model may also utilize a speed of the motor, a coolant pump speed, and a coolant sump temperature as inputs. The model may be a second order dynamic model. The output DC voltage may be higher than an input DC voltage of the variable voltage converter. At least one instrumented test vehicle may be operated to record data including measured inductor temperature and output DC voltage from which model constants are computed.

An electric drive system includes a variable voltage converter, an inverter, and a controller. The variable voltage converter has battery terminals connected to a battery and output terminals connected to the inverter. The variable voltage converter establishes an output DC voltage between the output terminals higher than a battery voltage. The variable voltage converter has an inductor. The inverter provides an electric motor with AC power. The controller is programmed to control the variable voltage converter to adjust the output DC voltage and to control the inverter to adjust a torque produced by the electric motor. The controller is further programmed to reduce the torque in response to an estimate of a temperature of the inductor exceeding a threshold. The output DC voltage may also be reduced in response to the estimate of the temperature of the inductor exceeding the threshold. The estimate is output by a dynamic model having the output voltage as an input. The dynamic model, which may be a second order model, may also use a pump speed, a coolant temperature, and a speed of the electric motor as inputs.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
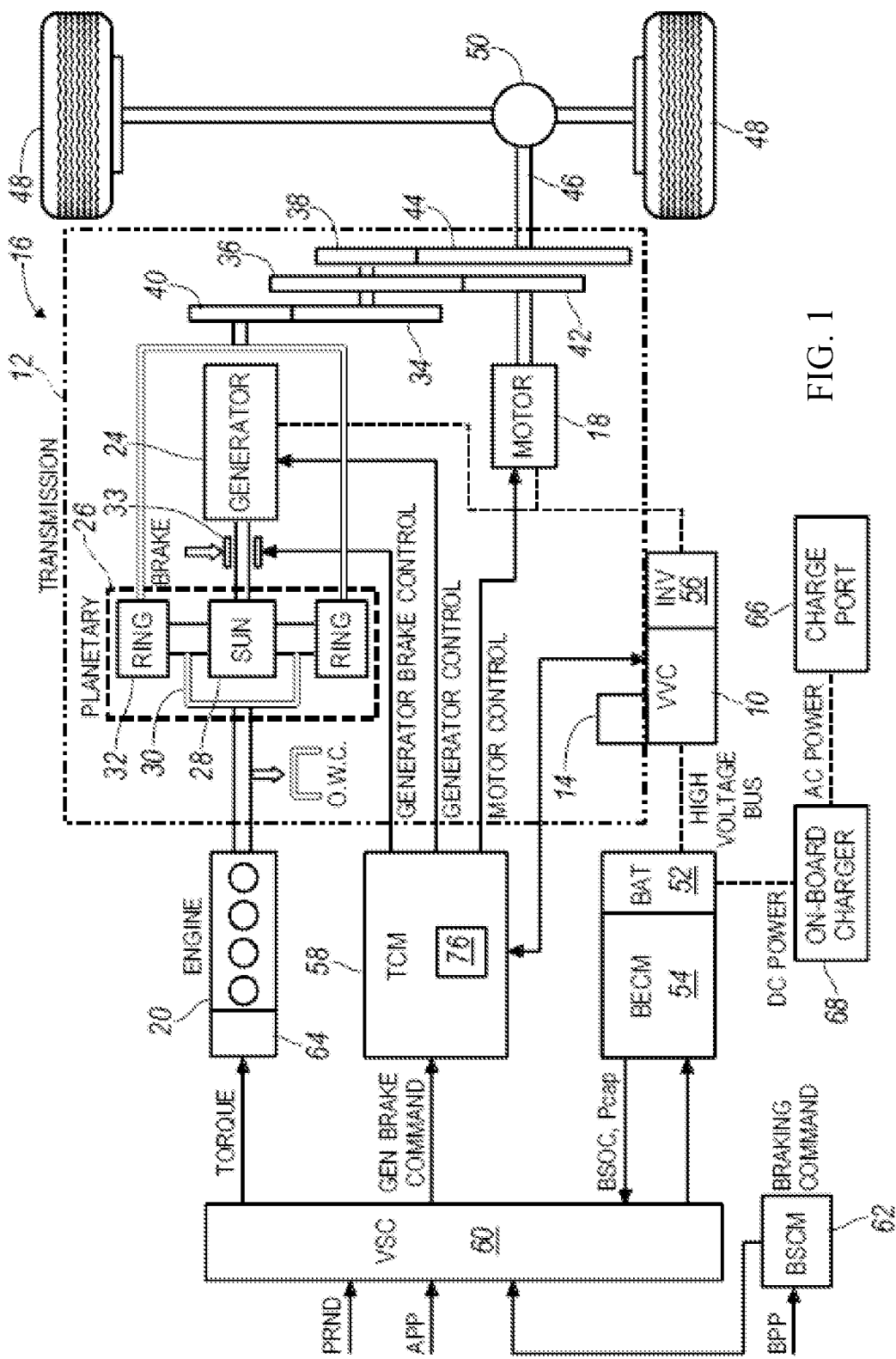
FIG. 1 illustrates a block diagram of an electric vehicle.

Referring to FIG. 1, a transmission 12 is depicted within a plug-in hybrid electric vehicle (PHEV) 16, which is an electric vehicle propelled by an electric machine 18 with assistance from an internal combustion engine 20 and connectable to an external power grid. The electric machine 18 is an AC electric motor according to one or more embodiments, and depicted as the "motor" 18 in FIG. 1. The electric machine 18 receives electrical power and provides drive torque for vehicle propulsion. The electric machine 18 also functions as a generator for converting mechanical power into electrical power through regenerative braking.

The transmission 12 has a power-split configuration, according to one or more embodiments. The transmission 12 includes the first electric machine 18 and a second electric machine 24. The second electric machine 24 is an AC electric motor according to one or more embodiments, and depicted as the "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 also includes a one-way clutch (OWC) and a generator brake 33, according to one or more embodiments. The OWC is coupled to the output shaft of the engine 20 to only allow the output shaft to rotate in one direction. The OWC prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. In other embodiments, the OWC and the generator brake 33 are eliminated, and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, Pcap) that is indicative of the BSOC and the battery power capability to other vehicle systems and controllers.

The transmission 12 includes a Variable Voltage Control (VVC) 10 and an inverter 56. The VVC 10 and the inverter 56 are electrically connected between the main battery 52 and the first electric machine 18; and between the battery 52 and the second electric machine 24. The VVC 10 "boosts" or increases the voltage potential of the electrical power provided by the battery 52. The VVC 10 also "bucks" or decreases the voltage potential of the electrical power provided by the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the main battery 52. Other embodiments of the transmission 12 include multiple inverters (not shown), such as one invertor associated with each electric machine 18, 24.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an pedal position. The VSC 60 provides output that represents a desired wheel torque, desired engine speed, and generator brake command to the TCM 58; and contactor control to the BECM 54.

The vehicle 16 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 provides a regenerative braking command to the VSC 60, according to one embodiment.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle 16 is configured as a plug-in hybrid electric vehicle (PHEV) according to one or more embodiments. The battery 52 periodically receives AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

Although illustrated and described in the context of a PHEV 16, it is understood that embodiments of the VVC 10 may be implemented on other types of electric vehicles, such as a Hybrid Electric Vehicle (HEV) or a Battery Electric Vehicle (BEV).

Figure 2:
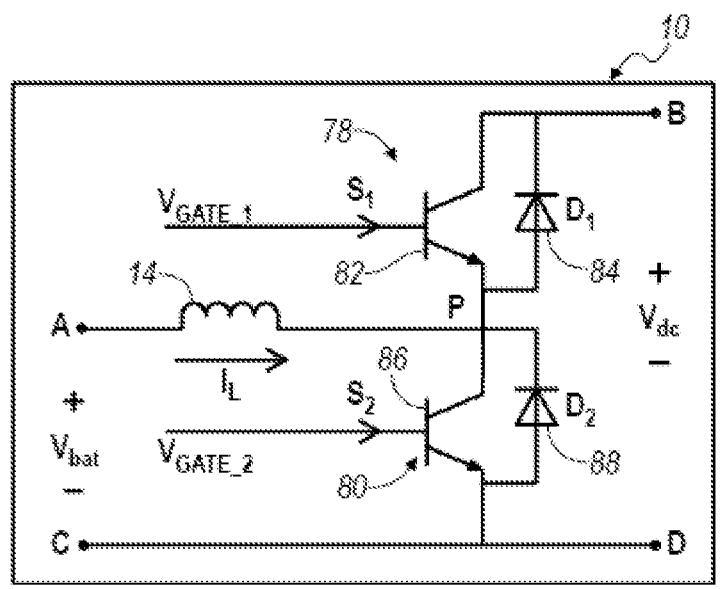
FIG. 2 is a block cross section of an exemplary variable voltage converter.

With reference to FIG. 2, the VVC 10 includes a first switching unit 78 and a second switching unit 80 for boosting the battery (input) voltage (Vbat) to provide output voltage ($V_{dc}$). The first switching unit 78 includes a first transistor 82 connected in parallel to a first diode 84, but with their polarities switched (anti-parallel). The second switching unit 80 includes a second transistor 86 connected anti-parallel to a second diode 88. Each transistor 82, 86 may be any type of controllable switch (e.g., an insulated gate bipolar transistor (IGBT) or field-effect transistor (FET)). Additionally, each transistor 82, 86 is individually controlled by the TCM 58. The inductor assembly 14 is depicted as an input inductor that is connected in series between the main battery 52 and the switching units 78, 80. The inductor 14 generates magnetic flux when a current is supplied. When the current flowing through the inductor 14 changes, a time-varying magnetic field is created, and a voltage is induced. Other embodiments of the VVC 10 include different circuit configurations (e.g., more than two switches).

Figure 3:
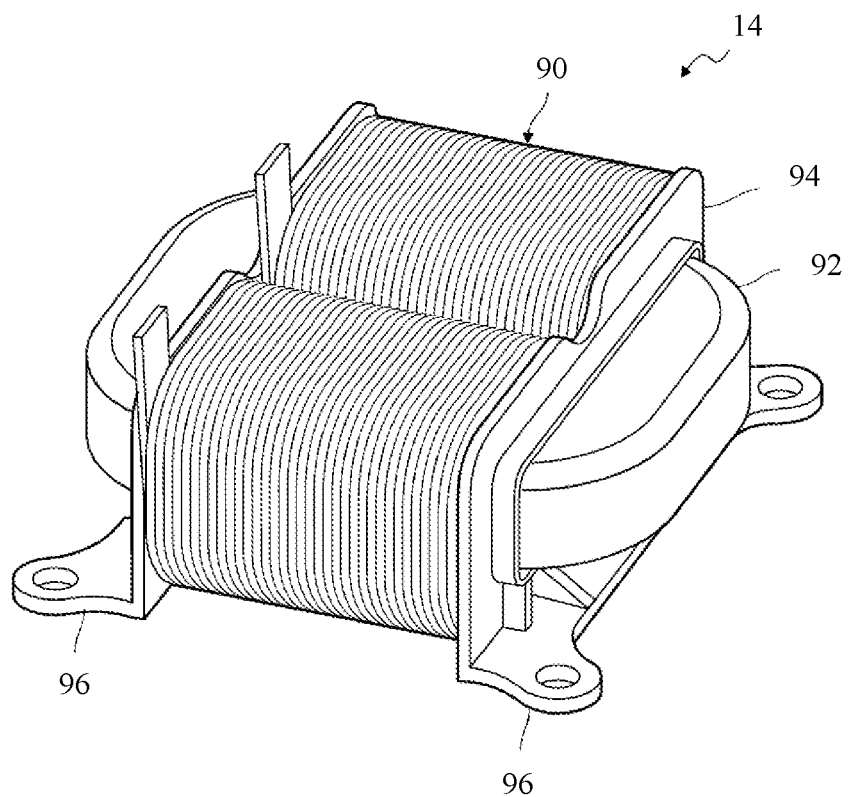
FIG. 3 is a pictorial view of an inductor.
Figure 4:
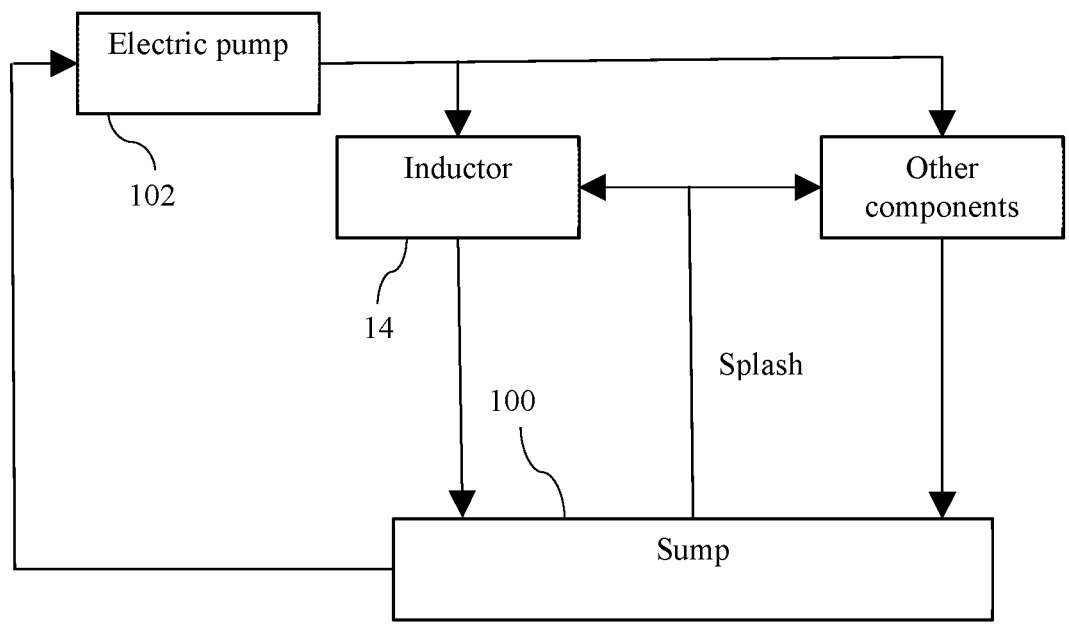
FIG. 4 is a cooling system of an inductor.

An inductor 14 is shown in FIG. 3. Inductor 14 includes electrically conductive wire 90 wound around a magnetically conductive core 92. These may be separated by an insulating frame 94. The frame may be fastened to a surface by feet 96. The inductor 14 may be mounted within the transmission chamber and directly cooled using a coolant, such as transmission fluid. The transmission fluid is an electrical insulator which can be used in direct contact with electrical components. As shown in FIG. 4, the coolant gathers in a sump 100 at a low point in the transmission case. An electrically driven pump 102 circulates the coolant and systematically distributes it to the inductor 14 and to other transmission components. Additional cooling is provided by the tendency for the coolant to be splashed onto the inductor 14 and other components by rotating components in the transmission case.

The temperature of the inductor 14 depends on the amount of current flowing through the conductor 90 and the voltage potential across the conductor 90. Recent trends in electric vehicles include higher current capability of the inductor. For example, increased battery power for the extended electric range in PHEVs and reduced battery cells for the same power in HEVs result in increased inductor current rating in electric vehicles. Additionally, reduced battery voltage also leads to an increase in the inductor ac losses due to a higher magnitude of high frequency ripple current. Therefore, due to additional heat generation, the temperature of the inductor 14 will generally increase and if heat is not dissipated, the inductor temperature may exceed predetermined limits.

Directly measuring the temperature of the inductor may be unreliable. Physical space available for attaching thermocouples is limited. Thermocouples may come loose during usage and produce inaccurate measurements or no measurements at all. For these reasons, it is desirable to estimate the temperature using mathematical models based on quantities that are more easily measured. A threshold at which corrective actions are initiated must be set to protect the inductor when the estimate is higher than the threshold.

Figure 5:
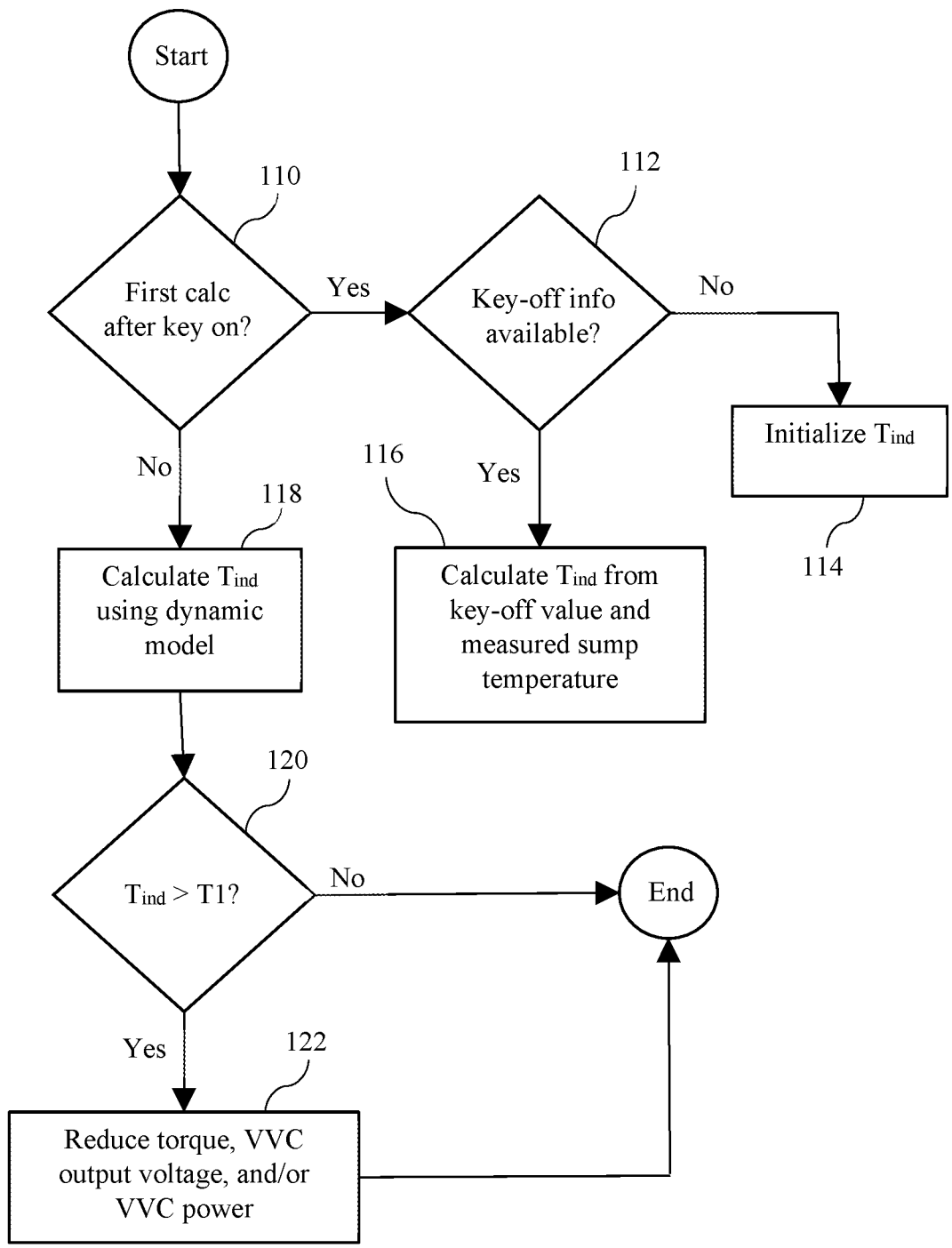
FIG. 5 is a flowchart for operation of an inductor of a vehicle powertrain.

FIG. 5 illustrates a control algorithm for operating an inductor in a vehicle powertrain. This algorithm is executed by a controller, such as 58 or 60, at regular intervals whenever the key is on. For example, the algorithm may be executed every 100 ms in response to an interrupt signal. At 110, the controller checks whether this is the first calculation since turning the key on. If so, then the controller checks at 112 whether information was saved from the most recent key-off event. If not, then the controller initializes $T_{ind}$, the estimated inductor temperature, to a default values at 114. If key-off information is available at 112, then the controller calculates $T_{ind}$ from the stored value and a measured sump temperatures at 116. Specifically, based on how much time has passed since the key-off event, the controller estimates how much the inductor would have cooled down in the measured conditions. If this is not the first calculation since key-on, then the controller uses a dynamic model to calculate $T_{ind}$ at 118. The dynamic model is discussed in more detail below. At 120, the controller checks whether the calculated $T_{ind}$ exceeds a threshold T1. If so, the controller reduces at least one of a torque, a VVC output voltage, or a VVC power at 122. The degree of reduction from nominal values may depend on the current value of $T_{ind}$ and on a rate of change of $T_{ind}$.

Figure 6:
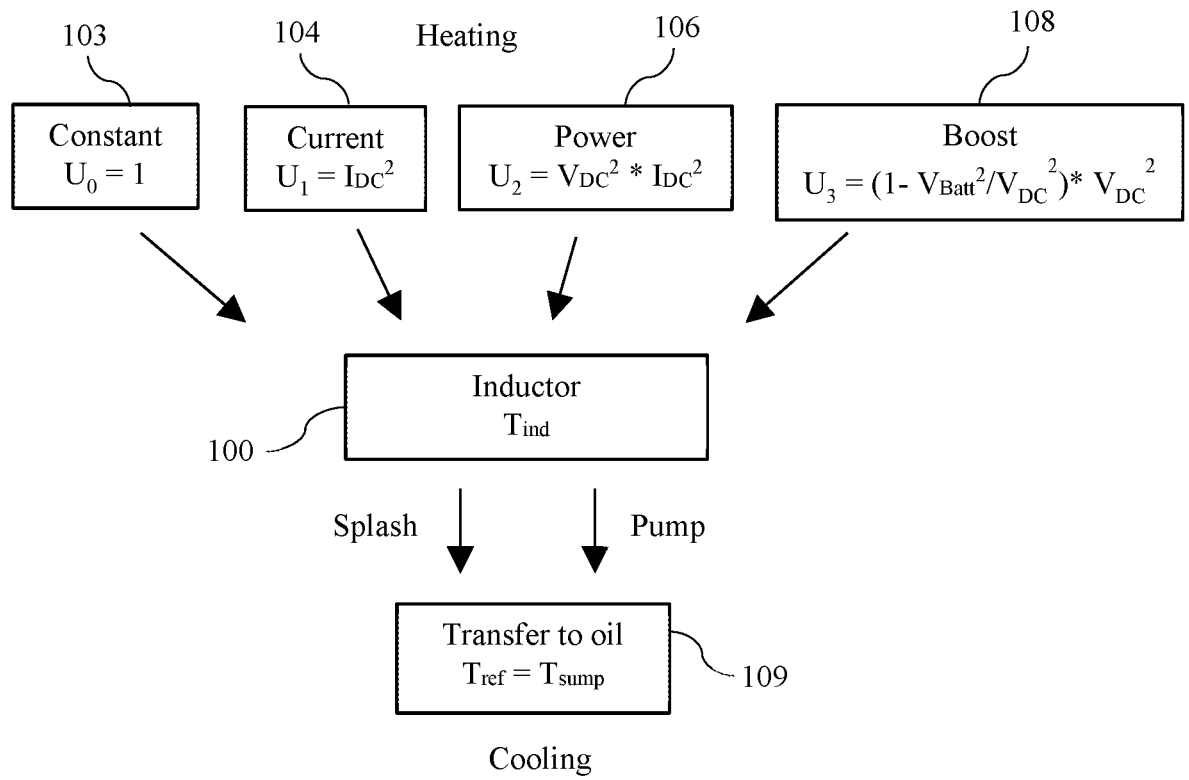
FIG. 6 is a block diagram of an inductor temperature model.

FIG. 6 is a block diagram of the effects considered by a dynamic thermal model for an inductor. Block 100 represents the heat stored in the inductor as characterized by the quantity $T_{ind}$. Four sources of heating, constant heating 103, heating based on current 104, heating based on power 106, and heating based on boost level 108 are considered. Each of these heating sources is characterized by a $U_i$ term proportional to the magnitude of that heating effect. The inductor is cooled by transferring heat to oil as indicated at 109. Transfer to oil is a function of the temperature of the oil measured at the sump $T_{sump}$. Contact between the oil and the inductor may be due to either oil splashing from the sump or from oil being actively pumped past the inductor using a pump. The flow rate of oil contacting the inductor due to splashing is related to the speed $F_2$ of the traction motor. The flow rate of oil contacting the inductor due to the pump is related to the pump speed $F_1$. The pump may be driven, for example, by a second electric motor with a different speed than the traction motor.

Each heat flow rate is treated as a linear function of the oil flow rates. In a first order model, the temperature increase due to each heating source is $\Delta t(B_{ai}+B_{bi}F_1+B_{ci}F_2)U_i$ where $\Delta t$ is the time between executions and $B_{ai}$, $B_{bi}$, and $B_{ci}$ are empirical constants. The temperature decrease due to cooling is $\Delta t(B_d+B_e F_1+B_f F_2)(T_{ind}-T_{ref})$ where $B_d$, $B_e$, and $B_f$ are empirical constants. A first-order dynamic model has the form:

$$T_{ind}^+ = T_{ind} + \Delta t \big(B_1 + B_2 F_1 + B_3 F_2 + (B_4 + B_5 F_1 + B_6 F_2)I_{dc}^2 +$$
$$(B_7 + B_8 F_1 + B_9 F_2)V_{dc}^2 I_{dc}^2 + (B_{10} + B_{11}F_1 + B_{12}F_2)\big(1 - V_{batt}^2/V_{dc}^2\big)V_{dc}^2 +$$
$$(B_{13} + B_{14}F_1 + B_{15}F_2)(T_{sump} - T_{ind})\big)$$

where $T_{ind}$ is the current inductor temperature estimate, $T_{ind}^+$ is the next inductor temperature estimate, and $B_i$ are empirical constants.

In a second order model, the temperature decrease due to cooling also considers the temperatures at the time of the previous estimate. A second-order dynamic model has the form:

$$T_{ind}^+ = T_{ind}^- + \Delta t \big( B_1 + B_2 F_1 + B_3 F_2 + (B_4 + B_5 F_1 + B_6 F_2) I_{dc}^2 +$$

$$(B_7 + B_8 F_1 + B_9 F_2) V_{dc}^2 I_{dc}^2 + (B_{10} + B_{11} F_1 + B_{12} F_2)\big(1 - V_{batt}^2/V_{dc}^2\big)V_{dc}^2 +$$

$$(B_{13} + B_{14} F_1 + B_{15} F_2)(T_{sump}^- - T_{ind}^-)\big) +$$

$$\Delta t^2 (B_{16} + B_{17} F_1 + B_{18} F_2)\big(T_{sump}^- - T_{ind}^-\big)$$

where $T_{ind}^-$ is the previous inductor temperature estimate and $T_{sump}^-$ is the sump temperature at the previous time step. The inventors have discovered that a $2^{nd}$ order model of this form provides a more accurate prediction of the winding temperatures than the $1^{st}$ order model discussed above.

Figure 7:
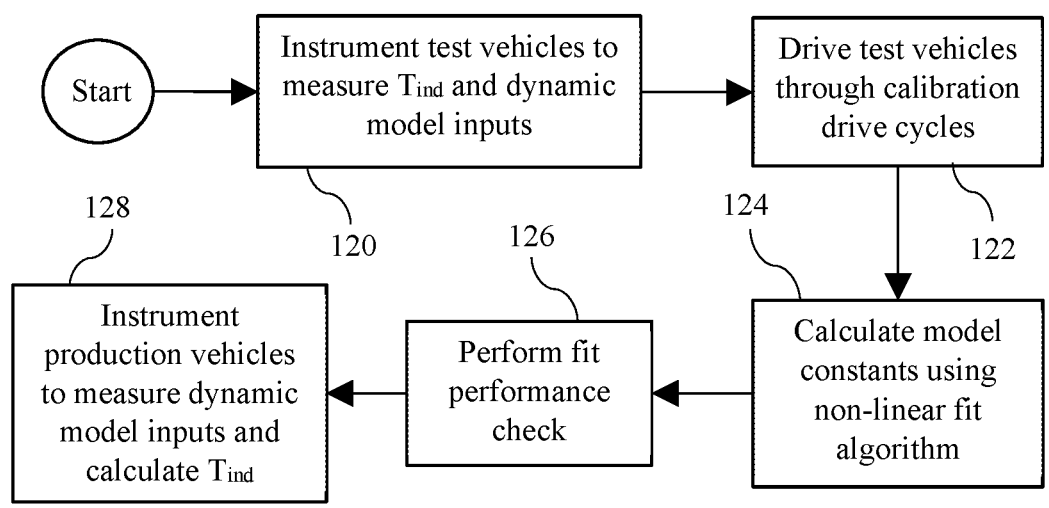
FIG. 7 is a flow chart for producing vehicles that utilize dynamic models for inductor temperature prediction.

FIG. 7 is a block diagram illustrating the method of deploying inductor temperature prediction models such as those discussed above. At 120, a set of test vehicles are instrumented to measure and record the model output $T_{ind}$ as well as the model inputs $F_1$, $F_2$, $I^2_{dc}$, $V^2_{ac}$, $V^2_{batt}$, and $T_{sump}$ at regular intervals. For example, thermocouples may be installed on the inductor. If it is not known in advance which position on the inductor will be most critical, multiple thermocouples may be installed in different locations. Although the expense per vehicle of installing these thermocouples may be significant, the number of test vehicles is relatively small compared to the number of vehicles that will eventually be produced for sale to customers. At 122, the test vehicles are driven through a number of calibration drive cycles. These cycles are selected to subject the inductor to a variety of conditions, including conditions that could result in the inductor temperature approaching or exceeding design limits.

At 124, the data captured by the test vehicles during the drive cycles is processed using a non-linear fit algorithm to determine values for the empirical constants $B_i$ in the dynamic thermal models. At 126, a fit performance check is performed. For example, the models may be executed using the measured inputs during the drive cycles to determine what outputs the models would have predicted. Correlation between these predicted temperatures and the measured temperatures is analyzed to assess a maximum prediction error. Finally, at 128, production vehicles are instrumented to measure the model inputs. In the production vehicles, the inductor temperature $T_{ind}$ is estimated by executing the dynamic model using the empirical constants. The maximum prediction error as determined at 126 may be used to set the temperature limit T1 from FIG. 5 at which the operating envelop is restricted.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method of operating a motor of an electric drive system, comprising:
    adjusting, with a controller, an output DC voltage of a variable voltage converter having an inductor;
    adjusting, with the controller, a winding current such that a motor produces torque;
    pumping a coolant from a sump past the inductor using a pump;
    reducing the torque of the motor in response to an estimate of an inductor temperature exceeding a threshold, wherein the inductor temperature is estimated by the controller using a dynamic model based on the output DC voltage and a speed of the pump; and
    in response to a vehicle being turned off and then back on, estimating the inductor temperature based on an estimate of the inductor temperature before the vehicle was turned off and a measured temperature of the coolant in the sump.

2. The method of claim 1 wherein the output DC voltage is higher than an input DC voltage of the variable voltage converter.

3. The method of claim 2 further comprising reducing the output DC voltage in response to the estimate of the inductor temperature exceeding the threshold.

4. The method of claim 1 wherein inputs of the dynamic model further include a speed of the motor.

5. The method of claim 1 wherein inputs of the dynamic model further include the measured temperature of the coolant in the sump.

6. The method of claim 1 wherein the dynamic model is a second order dynamic model.

7. The method of claim 1 further comprising:
    operating at least one instrumented test vehicle to record data including measured inductor temperature and output DC voltage; and
    computing model constants based on the recorded data.

* * * * *